United States Patent Office 2,773,702
Patented Dec. 11, 1956

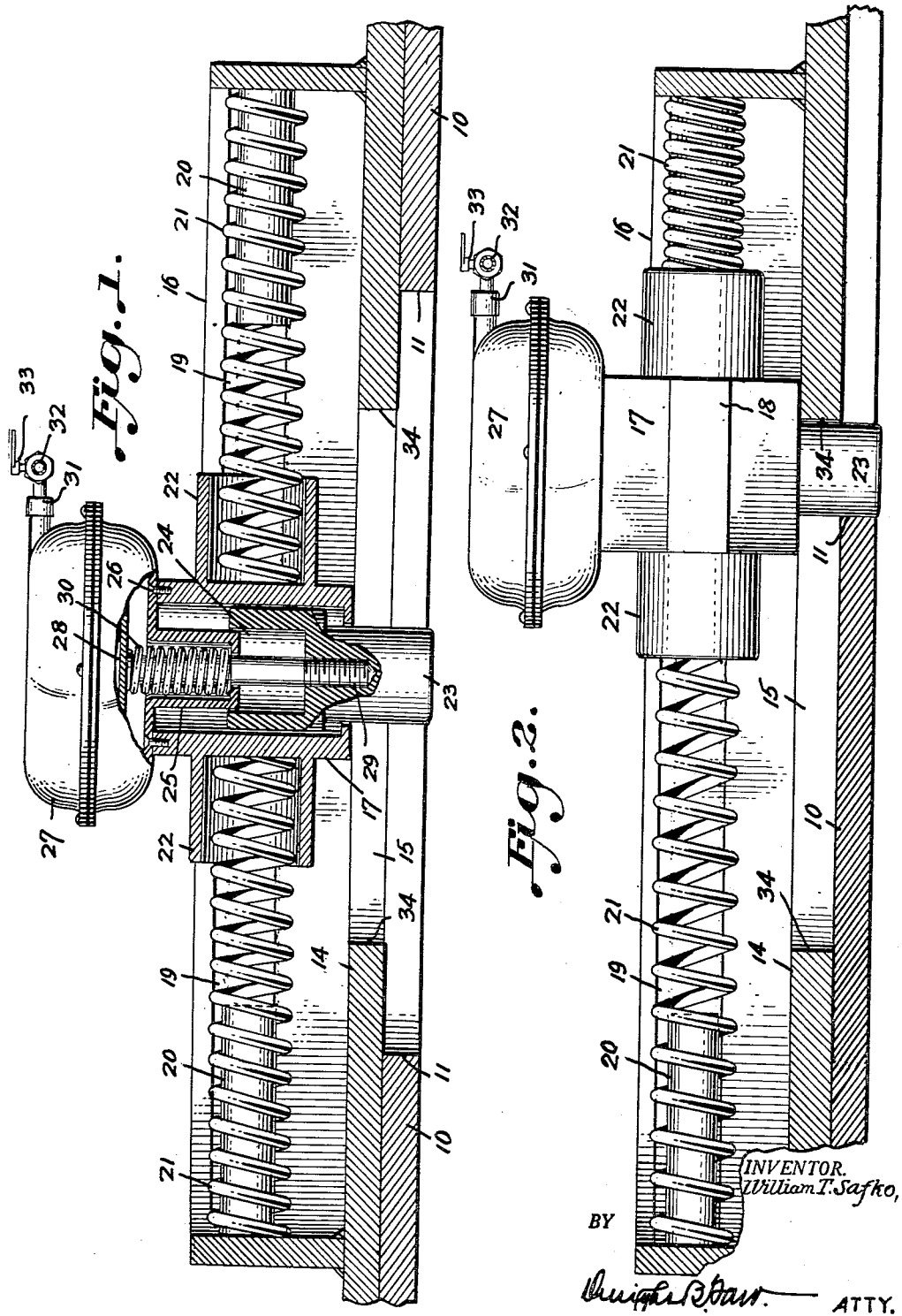

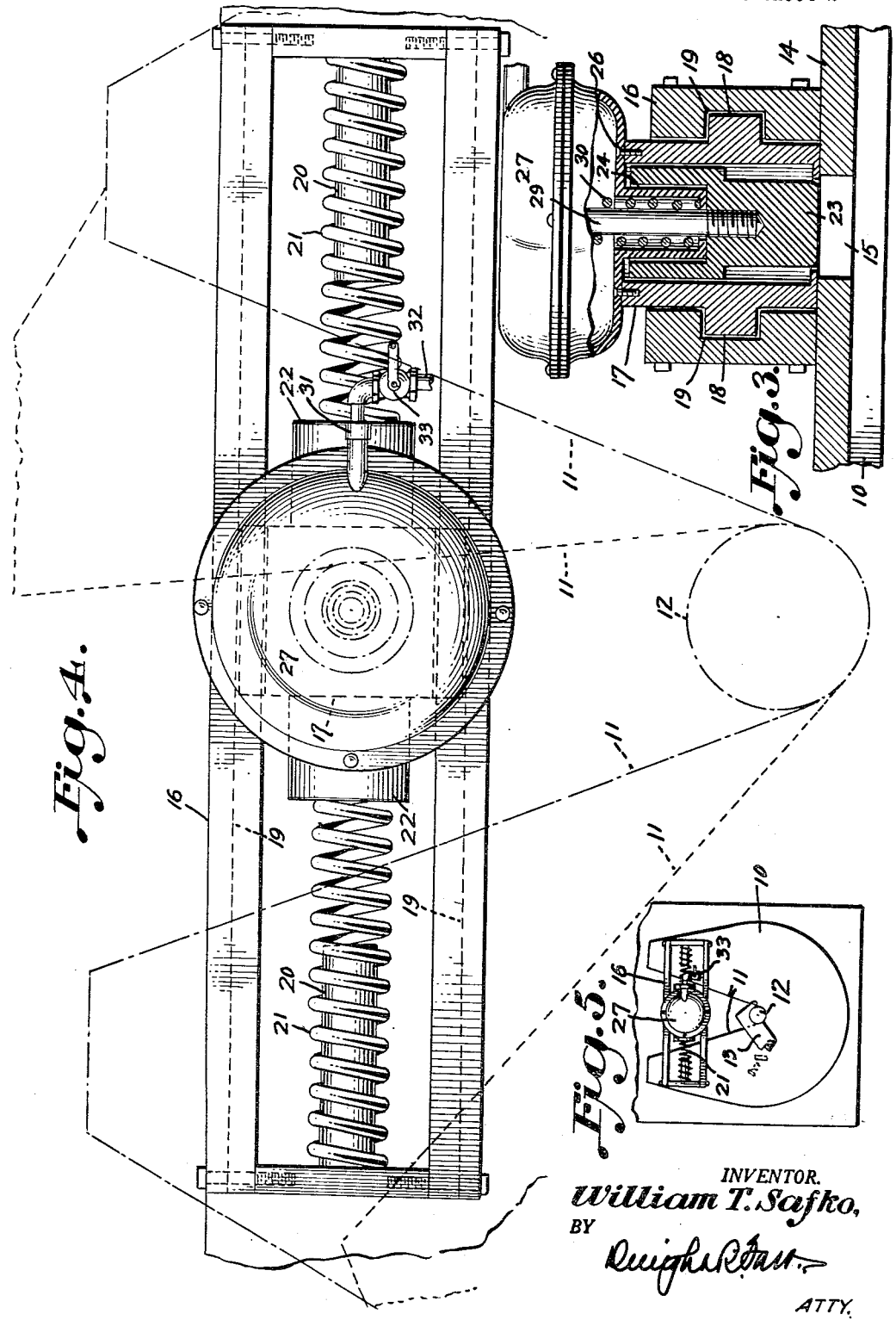

2,773,702

JACK-KNIFING PREVENTING DEVICE FOR TRACTOR-TRAILERS

William T. Safko, Short Hills, N. J.

Application May 16, 1955, Serial No. 508,476

6 Claims. (Cl. 280—432)

This invention is a tractor trailer hook-up having particular reference to means for coupling adjacent ends of a tractor and trailer in such manner as to permit free normal movements of said ends with respect to each other, but providing means for locking the joined ends of the tractor and trailer from further angular movement with respect to one another when a predetermined angle between said elements has been reached.

The primary object of the invention is to provide means actuated by the operator of the vehicle to limit the angular lateral movement of the tractor and the trailer with respect to one another when "jackknifing" occurs, that is, the tractor turning at an excessive angle relative to the trailer.

A further object of the invention is to provide means when jackknifing occurs to first resist the movement of the tractor with respect to the trailer by resilient or cushioning means and then when a dangerous angularity between the tractor and trailer occurs to securely lock these bodies against further angular movement with respect to each other to prevent damage to either or both the cab and body or occupants or goods of either.

A further object of the invention is to provide means capable of being easily and quickly actuated by the vehicle operator for bringing about first a cushioning of the angular movement of the vehicle bodies with respect to one another when the danger limit is being approached, and to automatically lock the vehicle ends together positively against further angular movement when the danger point has been reached.

A further object of the invention is to provide means of extremely simple and relatively inexpensive construction for application to the joined ends of a tractor-trailer combination without material alteration of either of these bodies, which reliably operates to positively check and lock the angular relationships between the bodies when the danger point in turning has been reached, and which may be equally as readily released in order that the vehicle bodies may assume their normal travelling relationship.

With the foregoing objects in view, together with others which will appear as the description proceeds, the invention consists in the novel construction, combination and arrangement of parts, all as will be described more fully hereinafter, illustrated in the drawings, and particularly pointed out in the claims.

In the drawing:

Fig. 1 is a sectional view taken transversely through the coupler base and fifth wheel of a conventional tractor unit and illustrating the application thereto of a locking device constructed in accordance with the invention, the view illustrating the locking pin in the position it will assume when in projected or operative position, Fig. 2 is a similar view showing the parts in the position they will assume when the danger angular relationship between the truck and trailer have been reached and the locking is complete, Fig. 3 is a transverse sectional view taken through the supporting frame for the traveller or head with the locking pin retracted, Fig. 4 is a top plan view showing the device of my invention in the position it will assume under normal conditions, and Fig. 5 is a diagrammatic view similar to Fig. 4 and illustrating the location of the locking arrangement with respect to the vehicle fifth wheel under normal driving conditions.

Referring now to the drawings, and particularly to Fig. 5 thereof, the conventional fifth wheel of the tractor unit is indicated at 10 and comprises the flat plate provided with a slot defined by the divergent side walls 11 entering the said plate from the rear edge thereof to receive the coupling pin 12 depending from the trailer member and locked therewith by conventional latch means represented at 13. As is well known, the coupler plate 14 secured to the underside of the front end of the trailer is a flat metallic plate to rest upon the fifth wheel 10 and the two plates rotate in a substantially horizontal plane in frictional engagement with one another and with respect to each other. This coupler plate is rigidly secured to the bottom of the trailer body in any preferred manner.

In the application of the device embodying my invention to the assembled vehicle bodies, the coupler plate is provided with a cut-away portion or slot 15 disposed rearwardly of the coupler plate behind the king pin 12 and transversely of the coupler plate and overlying the coupler slot of the fifth wheel plate 10 when the vehicles are in normal longitudinal alignment with one another. The coupler plate has secured to its upper face and transversely thereof a substantially rectangular frame indicated at 16 having slidably mounted therein a head or traveller 17. This head is provided on opposite sides with extensions 18 to slidably ride in grooves 19 disposed longitudinally on the inner faces of the sides of the frame 16. The ends of the frame are equipped with inwardly projecting pins 20 around which are coiled the outer ends of cushioning springs 21, the said springs being engaged at their inner ends in socket members 22 carried by the head or traveller 17. These springs 21 will be of equal tension so that the head or traveller 17 will be yieldably maintained midway between the ends of the frame 16.

The head, as shown more particularly in Figs. 1 and 3, is hollow and arranged therein for movement at right angles to the coupler plate 14 is a locking pin 23. This pin is provided at its upper end with a socket portion 24 to receive a depending hollow stud member 25 secured as by screws 26 at its upper end to the head. This stud portion carries an air chamber 27 having a flexible diaphragm 28 therein and from the central portion of which depends a stud or pin 29 secured at its lower end to the locking pin 23. An expansion spring 30 is arranged within the stud member 25, encircles the pin 29 therein and has bearings at its ends respectively with the bottom of the stud portion and with the plate diaphragm 28. Fluid under pressure is admitted to the air chamber 27 above the diaphragm 28 through the nipple 31 to which the hose 32 is connected. A valve 33 in the nipple may be employed to make or break the fluid connection with the air chamber as desired. The pressure hose 32 will extend to the cab of the tractor and will be provided with suitable valve means (not shown) by which the operator may control the flow of fluid pressure to the chamber 27. If desired, a similar connection between the hose 32 and the braking control of the vehicle may be made if it is desired to operate the locking pin 23 when the brakes of the vehicle are applied.

From the foregoing it is obvious that with the release of air in the chamber 27, the spring 30 will force the diaphragm 28 upwardly allowing the pin 29 to lift or retract the locking pin 23, moving the same above the plane of the upper face of the fifth wheel 10, as shown more particularly in Fig. 3 of the drawings. However, when pressure within the chamber 27 is sufficient to overcome the tension of spring 30, the pin 29 moves downwardly, carrying with it the coupler or locking pin 23, projecting the same through the slot 15 in the coupler plate and into the slot in the fifth wheel defined by the divergent walls 11 therein. When the locking pin 23 is thus projected, should the fifth wheel and coupler plate rotate in a horizontal plane with respect to one another sufficiently far, one of the edges 11 of the slot in the fifth wheel will engage the pin 23. Continued movement will cause the traveller to move laterally against the tension of one of the cushioning springs 21, thus cushioning or resisting the thrust, and should the movement further continue the head 17 will move to the far end of the slot 15 in the coupler plate until it engages the wall or end 34 of the slot, as shown more particularly in Fig. 2 of the drawings. When this occurs, the projected pin 23 effectively resists any further relative rotary movement between the coupler plate 14 and the fifth wheel 10, thus locking these elements against any further movement with respect to one another. The length of the slot 15 in the coupler plate will determine the degree of relative rotative movement of the fifth wheel with respect to the coupler plate, and the end walls 34 of the slot 15 will be located at that point beyond which it would be unsafe to permit the vehicle units to further move. It is thus evident that jack knifing to a dangerous degree is prevented. If desired, in the normal travel of the vehicle, the air pressure in chamber 27 may be maintained to project the pin 23 into operative position, on the other hand the operator is free to control the movement of the locking pin as he sees fit. In instances where it might become necessary to retract the pin 23, as for instance in bringing about coupling or uncoupling movements of the units, it is but necessary for the operator to move a valve within his reach to bring about such action. In most instances, in normal operation of the tractor-trailer combination, the locking pin 23 will remain retracted, and will be operated to its projected position only when the vehicles skid or tend to move to an abnormal angular position with respect to one another.

I claim:

1. In a tractor trailer combination, a tractor having a fifth wheel member including a flat body portion having a guide slot and a trailer having a coupler base resting upon said fifth wheel member; a frame having a slot therein secured to said coupler base with its slot overlying and disposed transversely of said guide slot, a head mounted in said frame and slidable therein parallel with said frame slot, equalizing springs maintaining said head midway the ends of said slot, a locking pin mounted in said head for movement at right angles to the plane of said flat body portion, means for projecting said pin into said guide slot and into the path of the side edges of the latter, and a stop on said coupler base to limit the movement of said head therein.

2. In a tractor trailer combination, a tractor having a fifth wheel member including a flat body portion having a guide slot disposed longitudinally of said tractor and a trailer having a coupler base resting upon said fifth wheel; said coupler base having a slot disposed transversely of said trailer and overlying said guide slot, a head mounted for sliding movement parallel with and above said coupler base slot, a pin carried by said head and disposed above said coupler base slot, means normally holding said pin retracted from said guide and coupler base slots, and means for moving said pin through said coupler base slot and into said guide slot.

3. In a tractor trailer combination, a tractor having a fifth wheel member including a flat body portion having a guide slot and a trailer having a coupler base resting upon said fifth wheel member, said coupler base having an opening disposed transversely thereof and above said fifth wheel slot, a traveller mounted upon said coupler base above the slot therein, a pin slidably carried by said traveller and movable in a plane at right angles to the planes of said coupler base and fifth wheel, a spring normally holding said pin withdrawn from said slots, and pressure means for moving said pin against said tension means into projected position through said slots.

4. In a tractor trailer combination, a tractor having a fifth wheel member including a flat body portion having a guide slot and a trailer having a coupler base with a king pin to engage in said slot and resting upon said fifth wheel; said coupler base having a transverse slot disposed midway the sides thereof, a traveller mounted upon said coupler base above the slot therein, springs normally maintaining said head midway the ends of said coupler base slot, a pin carried by said traveller and movable in a plane at right angles to said coupler base, spring means normally holding said pin retracted from said fifth wheel and traveller base slots, and means for moving said pin against said tension means and into said slots.

5. In a tractor trailer combination, a tractor having a fifth wheel member including a flat body portion having a guide slot and a trailer having a coupler base resting upon said fifth wheel, said coupler base having a slot disposed transversely thereof and transversely of said fifth wheel slot, a hollow traveller member mounted upon said coupler base above the slot therein and movable longitudinally of said slot, spring means normally maintaining said traveller midway the ends of said coupler base slot, a locking pin slidably mounted in said traveller for movement in a plane at right angles to said coupler base, spring means normally holding said pin withdrawn from said fifth wheel and coupler base slots, an air chamber carried by said traveller, a diaphragm in said chamber connected to said pin, and means whereby fluid under pressure may be admitted to said chamber beyond said diaphragm.

6. In a tractor trailer combination, a tractor having a fifth wheel member including a flat body portion having a guide slot and a trailer having a coupler base resting upon said fifth wheel member, said coupler base having a transverse slot therein overlying the slot of said fifth wheel member, a hollow traveller mounted upon said coupler base and movable above and longitudinally of the slot therein, a pin mounted in said traveller for movement at right angles to the plane of said coupler base, a pressure cylinder mounted on said traveller, a diaphragm in said cylinder, a bolt connecting said pin with said diaphragm, spring means engaging said diaphragm and normally holding said pin out of said slot, means yieldably holding said traveller midway the length of said coupler base slot, and a fluid pressure connection for said cylinder.

References Cited in the file of this patent

UNITED STATES PATENTS

| | | |
|---|---|---|
| 2,126,819 | Schawlem | Aug. 16, 1938 |
| 2,454,626 | Borzell | Nov. 23, 1948 |
| 2,565,285 | Wakeman | Aug. 21, 1951 |
| 2,652,262 | Sherry | Sept. 15, 1953 |
| 2,723,865 | Leoni | Nov. 15, 1955 |